(12) United States Patent
Summers et al.

(10) Patent No.: US 6,212,760 B1
(45) Date of Patent: Apr. 10, 2001

(54) ALIGNMENT OF SLIDERS IN HEAD GIMBAL ASSEMBLIES

(75) Inventors: Robert N. Summers, Brea; Daniel Vera, Temecula, both of CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/310,015

(22) Filed: May 11, 1999

Related U.S. Application Data

(60) Provisional application No. 60/131,619, filed on Apr. 28, 1999.

(51) Int. Cl.$^7$ .................................................. G11B 5/42
(52) U.S. Cl. .................................... 29/603.06; 29/407.04; 29/407.1; 29/603.1; 360/245.1
(58) Field of Search ........................... 29/603.04, 603.05, 29/603.06, 603.1, 407.04, 407.1; 360/104, 103, 245, 245.1

(56) References Cited

U.S. PATENT DOCUMENTS 4,866,836 * 9/1989 Von Brandt et al. ............. 29/603.06
5,758,406 * 6/1998 Hunsaker et al. ................ 29/603.06

* cited by examiner

Primary Examiner—Carl E. Hall
(74) Attorney, Agent, or Firm—Louis J. Bachand

(57) ABSTRACT

Problems aligning a slider with a dimple in manufacture of head gimbal assemblies for disk drive suspensions are obviated by defining a series of optically readable indicia on or about the dimple that serve as a reference for positioning apparatus rather than the dimple.

20 Claims, 4 Drawing Sheets

ALIGNMENT OF SLIDERS IN HEAD GIMBAL ASSEMBLIES

REFERENCE TO RELATED APPLICATIONS

This application claims the benefit of U.S. Provisional Application Ser. No. 60/131,619 filed Apr. 28, 1999.

BACKGROUND OF THE INVENTION

1. Field of the Invention

This invention relates to manufacture of head gimbal assemblies, known as HGAs. More particularly, the invention relates to manufactures and manufacturing steps that simplify and make more accurate and less time-consuming the juxtaposing of the slider with the dimple when mounting the slider to the flexure tongue. The invention substitutes added optically readable indicia for the outlines of the dimple as the locating criteria for the slider, thus ensuring accurate placement of the slider every time.

2. Related Art

In the manufacture of suspensions comprising a load beam, a flexure attached to the load beam and having a tongue, and a slider, mounted for gimbaling movement around a dimple defined by the flexure tongue or the load beam rigid portion, the positioning of the slider by automatic equipment is essential to efficient manufacture. A misplaced slider, that is a slider that is not properly aligned with reference to the dimple, will not gimbal properly or predictably and are a costly defect that reduces manufacturing yield. Taking additional time to properly place the slider increases costs in a very cost conscious industry.

SUMMARY OF THE INVENTION

This application refers to sliders as the mounted element. The term slider herein is used to encompass not only the slider itself, a typically ceramic body designed to fly over the rotating disk in a disk drive, but also to include the read-write head carried within the slider body and connected to the device electronics.

The need for increased accuracy in positioning of sliders must be met at no greater expenditure of manufacturing time. This can be achieved by the use of automatic positioning apparatus using optical reading to locate the correct position. Presently available optical readers, known per se, cannot, however, read with certainty the location of the dimple because the dimple, being an upset or etch formed boss, lacks clear delineation at its junction with the surrounding wall of the flexure tongue or load beam rigid portion. That is, there is not a sufficiently sharp, or uniformly distributed, target for the optical reader to use as a marker for positioning the slider relative to the dimple.

It is an object, therefore, of the present invention to provide markers of such sharpness and uniformity of distribution that positioning equipment can read and position the slider with reference to them, as opposed to the dimple, with increased accuracy, better speed and fewer defects. It is a further object to provide a system of optically readable indicia, typically geometric shapes, arranged in a pattern useful in the invention method. It is a further object to provide a series of such indicia arranged in such proximity and uniformity of pattern relative to the dimple as to be useful as a proxy for the dimple in locating the slider properly on the flexure tongue.

These and other objects of the invention, to become apparent hereinafter, are realized in a head gimbal assembly of a load beam, a flexure attached to the load beam and having a tongue, and a slider attached to the flexure tongue, the load beam and flexure tongue defining between them a dimple positioned, sized and shaped to allow gimballing movement of the slider, where the head gimbal assembly has optically readable indicia centered on the dimple for precisely locating the slider opposite the dimple by reference to the optically readable indicia rather than the dimple.

In this and like embodiments, typically, the load beam defines the dimple, the flexure tongue is shaped to expose at least portions of the dimple and optically readable indicia from the side of the flexure tongue remote to the dimple, the dimple has a circular periphery, the optically readable indicia are uniformly distributed a given distance from the dimple periphery, and the flexure tongue is relieved along its longitudinal extent to expose the indicia, and the optically readable indicia are uniformly distributed about the periphery of the dimple, and the flexure tongue has a dog-bone shape to expose the optically readable indicia, the optically readable indicia being sharper edged than the dimple edge with the load beam.

In a further embodiment, the flexure tongue defines the dimple. In this and like embodiments, typically, the optically readable indicia comprise a series of circular holes uniformly distributed about the periphery of the dimple, or the optically readable indicia comprise a series of polygonal holes uniformly distributed about the periphery of the dimple, e.g. the polygonal hole optically readable indicia are diamond shaped in longitudinal cross-section, or the optically readable indicia comprise a series of arcuate holes uniformly distributed about the periphery of the dimple, the optically readable indicia are semi-circular in longitudinal cross-section, the optical indicia comprise a series of annular slots uniformly distributed over the surface of the dimple, or, the optically readable indicia comprise a series of arcuate slots uniformly distributed over the surface, the arcuate slots, or any combination of such shapes or other optical indicia noted above or used being distributed both within and/or without the periphery of the dimple in a generally uniform pattern.

In its method aspects, the invention provides a method of mounting sliders onto load beams or flexure tongues in position opposite the dimple in a head gimbal assembly comprising a load beam, a flexure having a tongue and a slider, including marking the situs of the dimple with optically readable indicia, and guiding placement of the slider on the flexure tongue with reference to the optically readable indicia rather than the dimple.

In this and like embodiments, typically, the invention method includes also forming the dimple on the load beam, and shaping the flexure tongue to expose the optically readable indicia for reading, or forming the dimple on the flexure tongue.

In this and like embodiments, typically, the method also includes forming a series of circular holes uniformly distributed about the periphery of the dimple as the optical indicia, forming a series of polygonal holes uniformly distributed about the periphery of the dimple as the optical indicia, e.g. the polygonal holes that are diamond shaped in longitudinal cross-section, forming a series of arcuate holes uniformly distributed about the periphery of the dimple, e.g. to be semi-circular in longitudinal cross-section, forming a series of annular slots uniformly distributed over the surface of the dimple, or any combination of such shapes, forming a series of arcuate slots uniformly distributed over the surface, and distributing the series of arcuate slots both within and/or without the periphery of the dimple in a generally uniform.

BRIEF DESCRIPTION OF THE DRAWING

The invention will be further described as to an illustrative embodiment in conjunction with the attached drawings in which.

DETAILED DESCRIPTION

The invention uses optical reading, or vision, equipment known per se and not forming part of the invention to assist in the placement of the sliders on the flexure tongues. Use of such equipment is enhanced in the invention by providing more easily and more accurately read indicia that the line formed at the boundary of the dimple and the surrounding flexure tongue or load beam wall.

Figure 1:
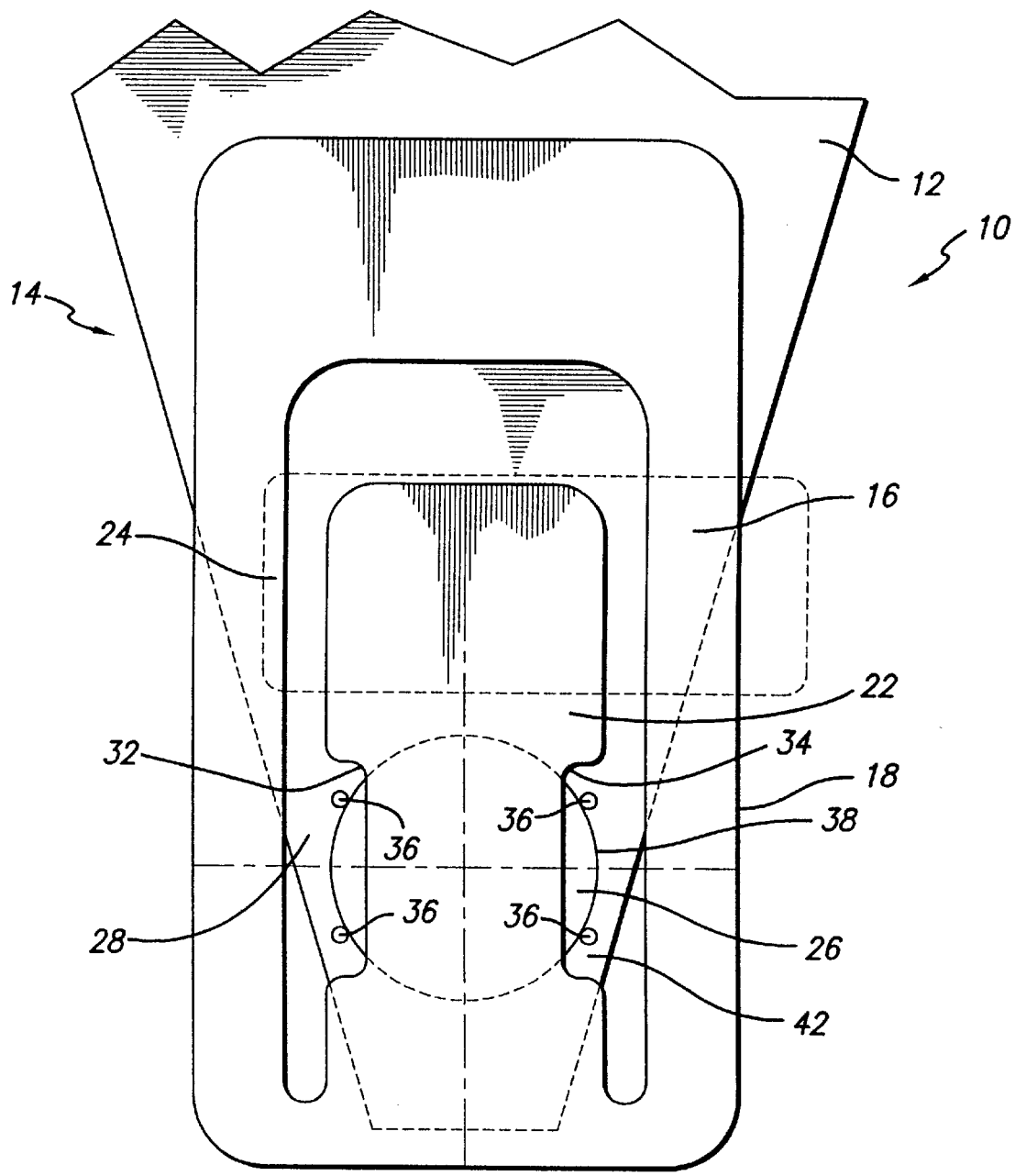
FIG. 1 is a plan of the invention head gimbal assembly in which the dimple is formed on the load beam.

With reference to FIG. 1, a head gimbal assembly 10 is shown to include the rigid portion 12 of load beam 14 (the base portion, the spring portion and the actuator for shifting the load beam not being shown). Flexure 16 is attached as by welding to the load beam portion 12. Flexure 16 comprises a frame 18 and a cantilevered tongue 22. A slider 24, shown in phantom, is to be attached to the flexure tongue 22 at a location that places the slider 24 precisely opposite the dimple 26 (formed on the load beam portion 12 in this embodiment). Thus placed the slider 24 will be able to gimbal about the dimple 26 with the flexure tongue 22.

In the FIG. 1 embodiment, the flexure tongue 22 is particularly positioned, sized and shaped to expose the invention optically readable indicia 28 by relieving the tongue along its length at laterally opposed locations 32, 34 to provide a dog-bone shape as shown rather than the more usual rectangular shape. Any other shape providing the flexure tongue function and exposure for reading of the indicia 28 will be useful as well.

The indicia 28 are shown to be a series of circular shaped holes 36 that are typically etched into the load beam around the dimple 26. Hereinafter described indicia shapes and patterns can also be used in this embodiment. The holes 36, like the other indicia of the invention, are sharp-edged, at least more sharp than the edge or boundary line 38 between the dimple 26 and the surrounding wall 42 of the load beam portion 12, and preferably so sharp that the reading equipment can readily identify the marker provided by the holes 36. The pattern of holes 36 is one of uniform circumferential distribution based on the corners of an imaginary rectangle centered on the axes of the dimple 26.

In FIGS. 2–8 a series of embodiments are shown having in common the presence of the dimple 52 on the flexure tongue 44, as opposed to the load beam portion 23. The shape, size, location and sharpness of edge characteristics of the indicia 28 in the first embodiment find their counterparts in the indicia 56 in these embodiments.

Figure 2:
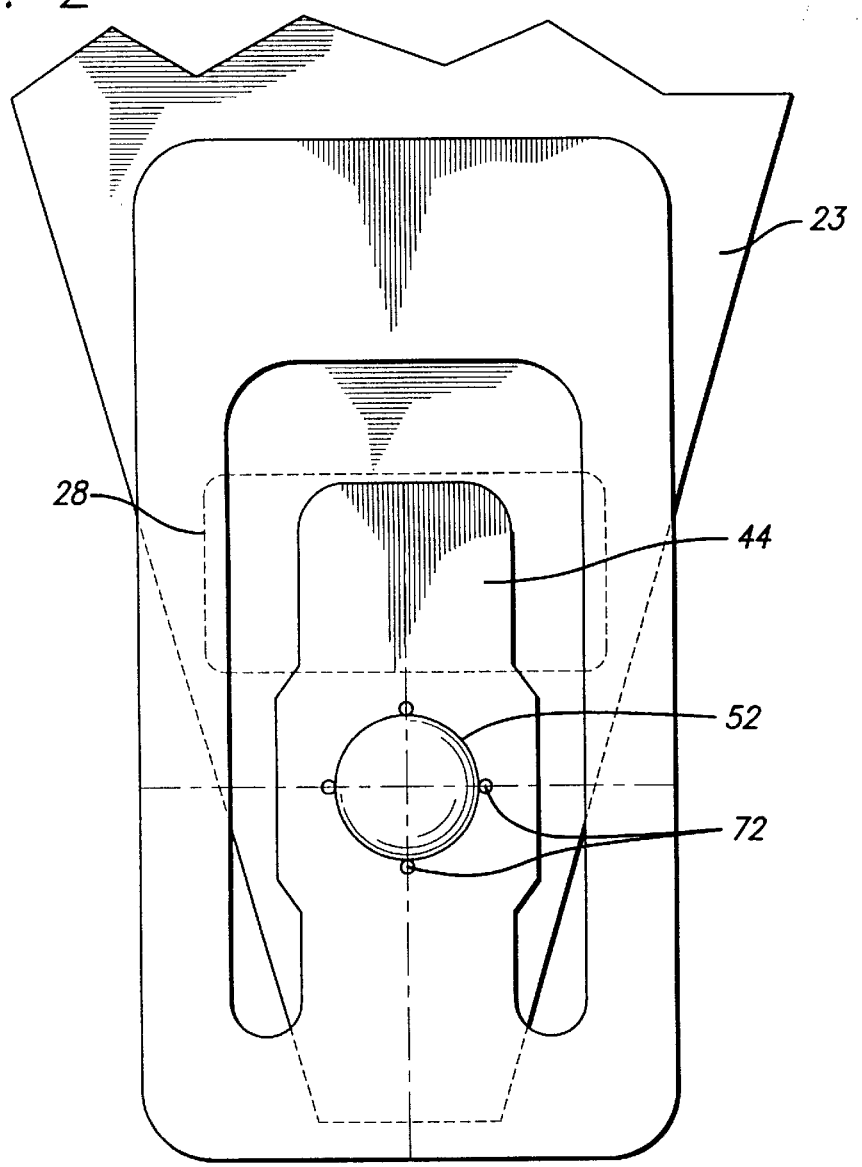
FIG. 2 is a plan view of the invention head gimbal assembly in which the dimple is formed on the flexure tongue.
Figure 3:
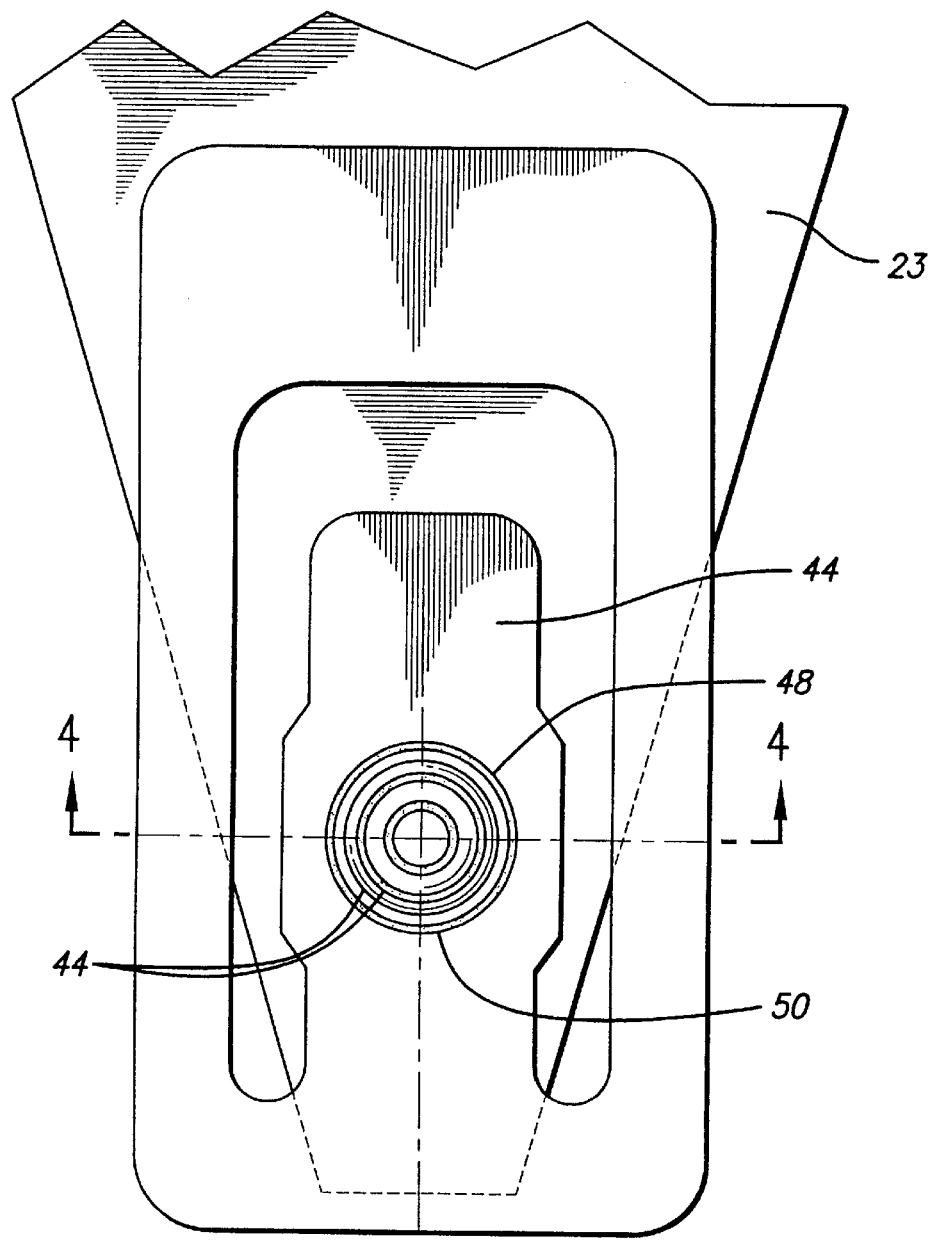
FIG. 3 is a plan view of the invention head gimbal assembly in which the flexure dimple has a series of annular rings forming the optical indicia.
Figure 4:
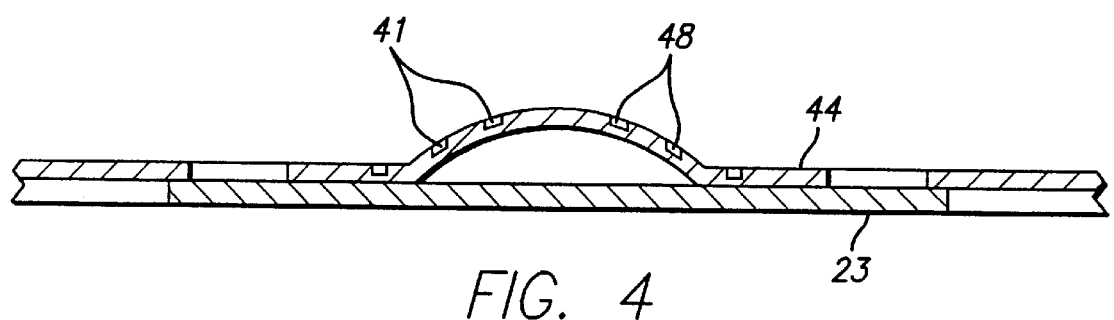
FIG. 4 is a view taken on line 4—4 in FIG. 1.
Figure 5:
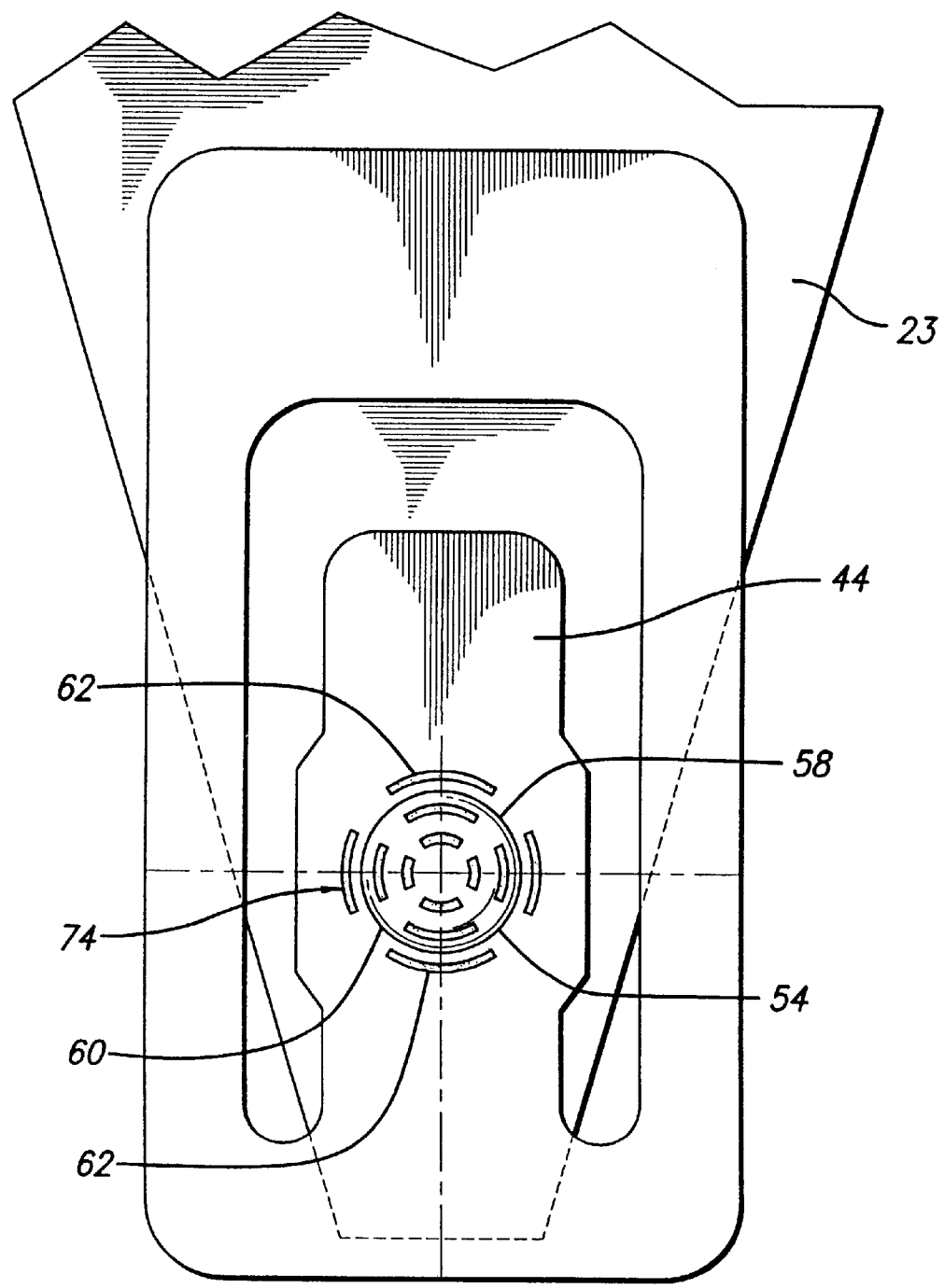
FIG. 5 is a view like FIG. 3, having a different pattern of optical indicia.

Thus, in FIG. 2, a series of circular holes 72 arranged at a spacing of 90° is provided as an effective target for the vision equipment to accurately locate and position the slider 28. In FIGS. 3 and 4 an axially extended, stepped series 44 of annular slots 46 are provided formed on the dimple 48 within the periphery 50 of the dimple. In FIG. 5, an axially extended, stepped series 74 of interrupted annular slots or arcuate slots 54 are provided formed on the dimple 58 partially within the periphery 60 of the dimple, and partially without, as at 62.

Figure 6:
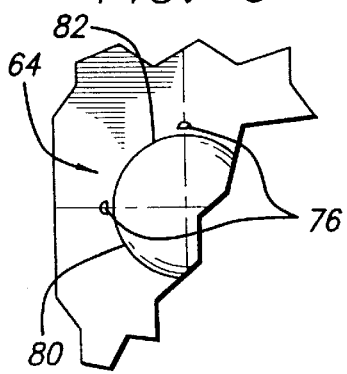
FIGS. 6, 7 and 8 are fragmentary view of particular optical indicia shapes, patterns and distributions.
Figure 7:
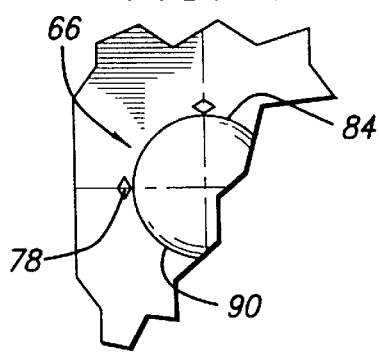
Figure 8:
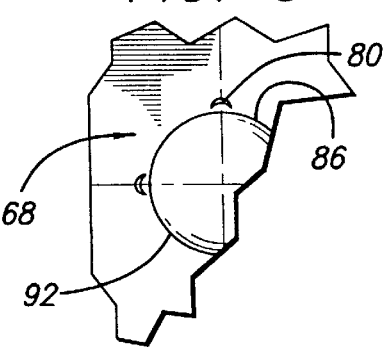

In FIGS. 6, 7 and 8, a 90° distribution of indicia is shown at 64, 66, and 68, comprising respectively, indicia 76 comprising in longitudinal cross-section semi-circles, indicia 78 comprising in longitudinal cross-section diamonds, and indicia 80 comprising arcuate holes, all uniformly spaced around the respective peripheries 82, 84 and 86 of the dimples 88, 90 and 92.

In the invention method, slider 24 is mounted onto the load beam portion 12 or flexure tongue 22 in position opposite, e.g. the dimple 28, in the head gimbal assembly 10, marking the situs of the dimple with optically readable indicia, e.g. 28, and guiding placement of the slider with reference to the optically readable indicia rather than the dimple.

The invention thus provides markers of such sharpness and uniformity of distribution that positioning equipment can read and position the slider with reference to them, as opposed to the dimple, with increased accuracy, better speed and fewer defects using a system of optically readable indicia, typically geometric shapes, arranged in a pattern useful in the invention method. The provided series of such indicia arranged in such proximity and uniformity of pattern relative to the dimple are useful as a proxy for the dimple in locating the slider properly on the flexure tongue.

We claim:

1. The method of mounting sliders onto flexure tongues in position opposite the dimple on a load beam in a head gimbal assembly comprising a load beam having a wall in which said dimple is defined and a flexure having a tongue and carrying a slider, including marking the boundary of the dimple with the surrounding load beam wall with optically readable indicia, and guiding placement of the slider on the flexure tongue with reference to said optically readable indicia rather than said dimple.

2. The method according to claim 1, including also forming said dimple on said load beam, and shaping said flexure tongue to expose said optically readable indicia for reading.

3. The method according to claim 1, including also forming said dimple on said flexure tongue.

4. The method according to claim 1, in which said dimple boundary is the periphery of said dimple, and including also forming a series of circular holes uniformly distributed about the periphery of said dimple as said optical indicia.

5. The method according to claim 1, in which said dimple boundary is marked by the periphery of said dimple, and including also forming a series of polygonal holes uniformly distributed about the periphery of said dimple as said optical indicia.

6. The method according to claim 5, in which said dimple boundary is marked by the periphery of said dimple, and including also forming said polygonal holes to be diamond shaped in longitudinal cross-section.

7. The method according to claim 4, in which said dimple boundary is marked by the periphery of said dimple, and including also forming a series of arcuate holes uniformly distributed about the periphery of said dimple.

8. The method according to claim 4, in which said dimple boundary is marked by the periphery of said dimple, and including also forming said arcuate holes to be semi-circular in longitudinal cross-section.

9. The method according to claim 4, in which said dimple boundary is marked by the periphery of said dimple, and including also forming a series of annular slots inwardly of said dimple periphery, said slots being uniformly distributed over the surface of said dimple.

10. The method according to claim 4, in which said dimple boundary is marked by the periphery of said dimple, and including also forming a series of arcuate slots inwardly of said dimple periphery, said slots being uniformly distributed over the surface of said dimple.

11. The method according to claim 10, including also distributing said series of arcuate slots both within and without the periphery of said dimple.

12. A method of mounting a slider onto one side of a flexure tongue that has on its other side a dimple opposed to a load beam in a head gimbal assembly, said flexure tongue having a wall in which said dimple is defined, including marking the boundary of the dimple with the surrounding flexure tongue wall with optically readable indicia, and guiding placement of the slider on the flexure tongue with reference to said optically readable indicia rather than said dimple.

13. The method according to claim 12, in which said dimple boundary is the periphery of said dimple, and including also forming a series of circular holes uniformly distributed about the periphery of said dimple as said optical indicia.

14. The method according to claim 12, in which said dimple boundary is marked by the periphery of said dimple, and including also forming a series of polygonal holes uniformly distributed about the periphery of said dimple as said optical indicia.

15. The method according to claim 12, in which said dimple boundary is marked by the periphery of said dimple, and including also forming said polygonal holes to be diamond shaped in longitudinal cross-section.

16. The method according to claim 12, in which said dimple boundary is marked by the periphery of said dimple, and including also forming a series of arcuate holes uniformly distributed about the periphery of said dimple.

17. The method according to claim 12, in which said dimple boundary is marked by the periphery of said dimple, and including also forming said arcuate holes to be semi-circular in longitudinal cross-section.

18. The method according to claim 12, in which said dimple boundary is marked by the periphery of said dimple, and including also forming a series of annular slots inwardly of said dimple periphery, said slots being uniformly distributed over the surface of said dimple.

19. The method according to claim 12, in which said dimple boundary is marked by the periphery of said dimple, and including also forming a series of arcuate slots inwardly of said dimple periphery, said slots being uniformly distributed over the surface of said dimple.

20. The method according to claim 19, including also distributing said series of arcuate slots both within and without the periphery of said dimple.

* * * * *